Figure 1:
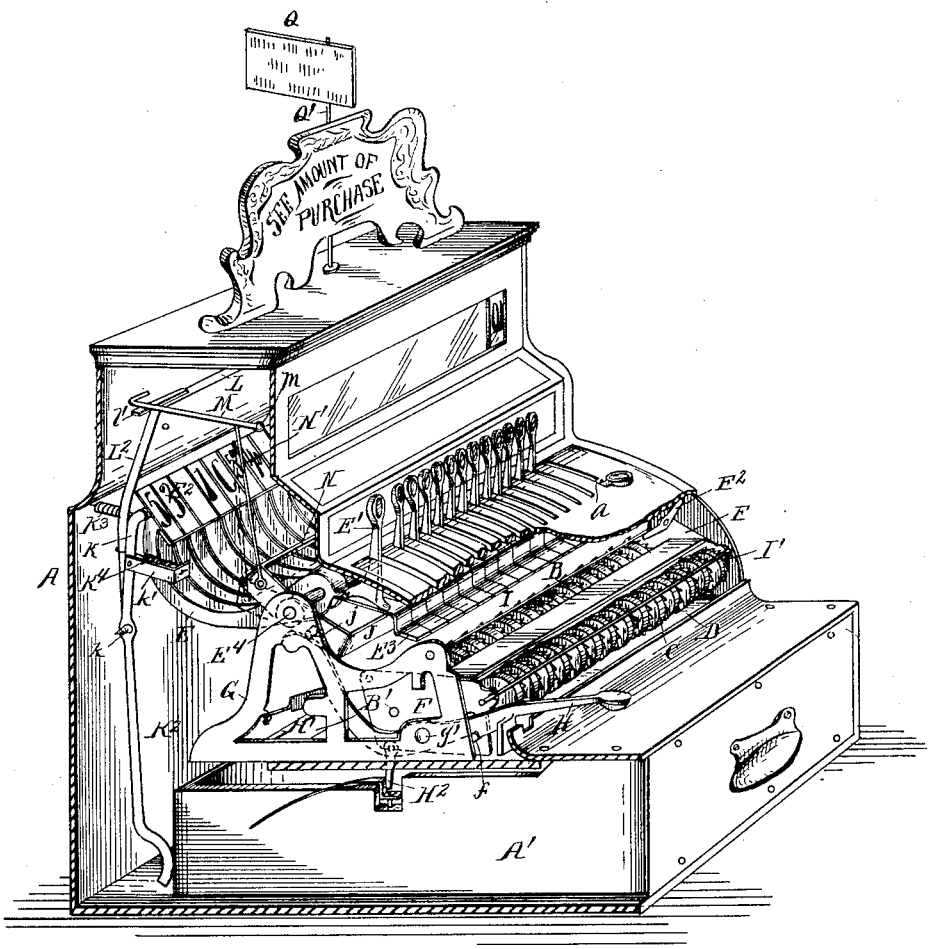

(No Model.)  3 Sheets—Sheet 1.
W. T. McGRAW.
CASH REGISTER AND INDICATOR.

No. 579,932. Patented Mar. 30, 1897.

WITNESSES
O. B. Banziger
M. O. Martin

INVENTOR
William T. McGraw
By his Attorney
Newell S. Wright.

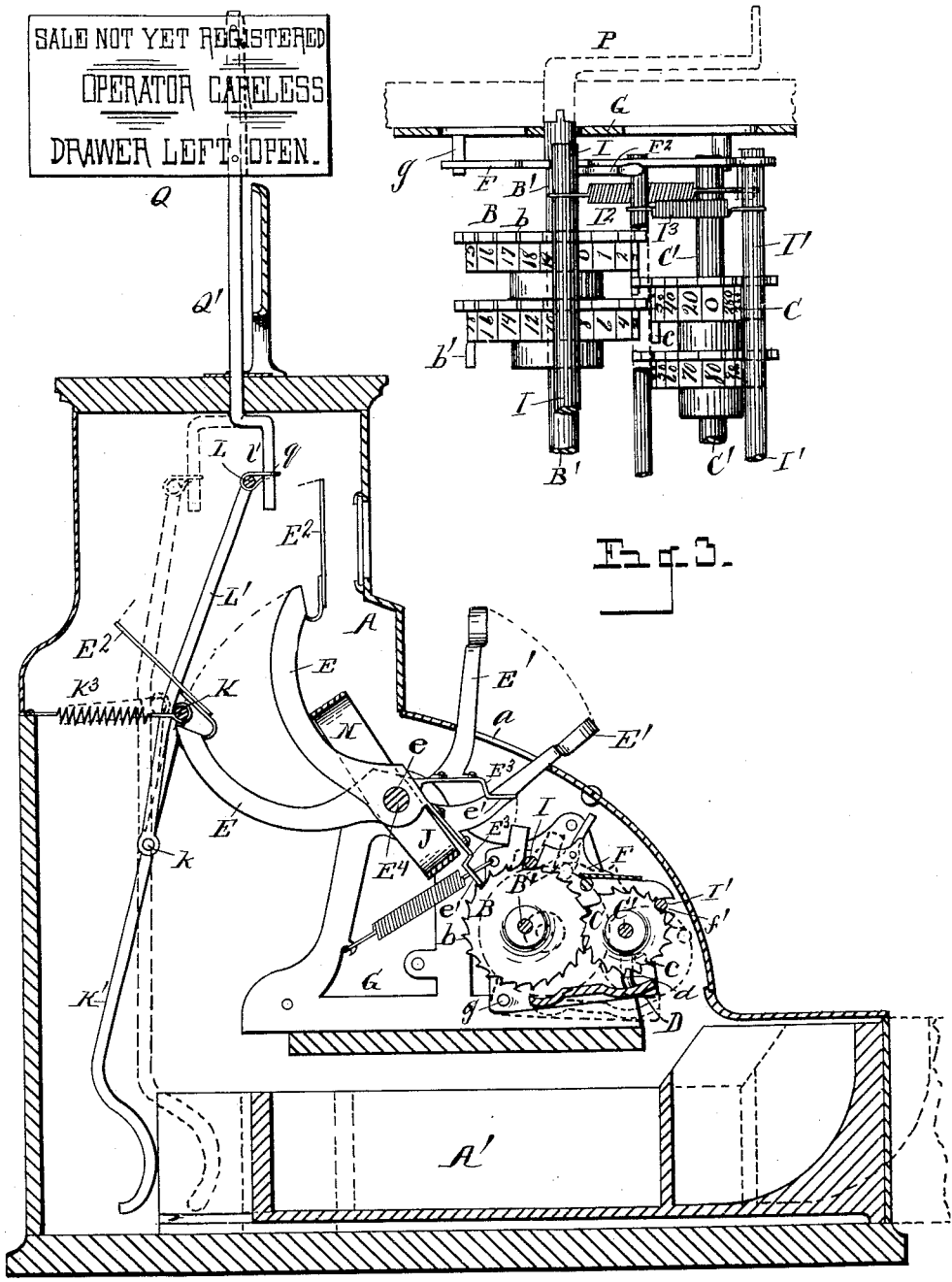

(No Model.)  3 Sheets—Sheet 3.
W. T. McGRAW.
CASH REGISTER AND INDICATOR.
No. 579,932.  Patented Mar. 30, 1897.
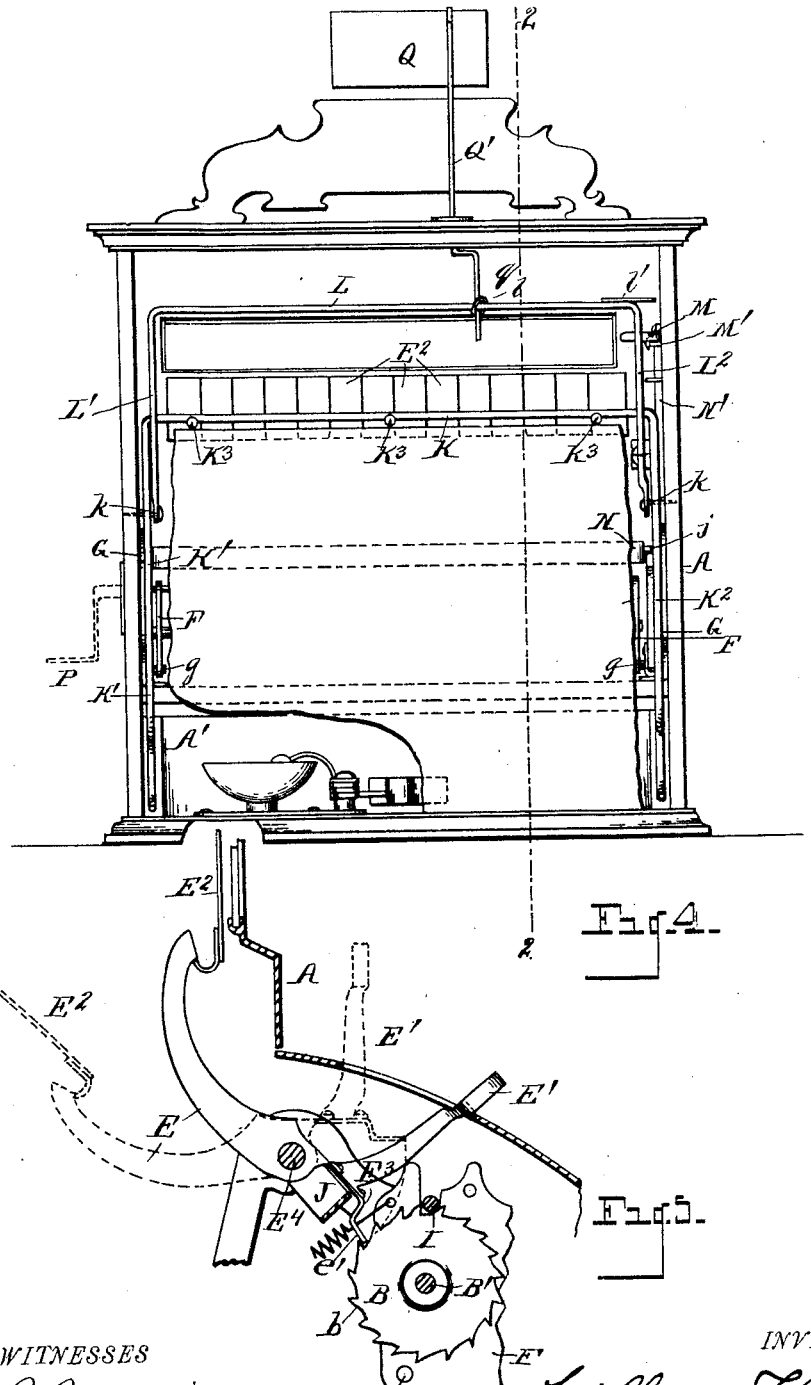
WITNESSES  INVENTOR
William T. McGraw
By his Attorney
Newell S. Wright

UNITED STATES PATENT OFFICE.

WILLIAM T. McGRAW, OF DETROIT, MICHIGAN.

CASH REGISTER AND INDICATOR.

SPECIFICATION forming part of Letters Patent No. 579,932, dated March 30, 1897.

Application filed December 21, 1895. Serial No. 572,854. (No model.)

*To all whom it may concern:*

Be it known that I, WILLIAM T. MCGRAW, a citizen of the United States, residing at Detroit, county of Wayne, State of Michigan, have invented a certain new and useful Improvement in a Cash Register and Indicator; and I declare the following to be a full, clear, and exact description of the invention, such as will enable others skilled in the art to which it appertains to make and use the same, reference being had to the accompanying drawings, which form a part of this specification.

My present invention pertains to certain new and useful improvements in a cash register and indicator; and it consists of the construction, combination, and arrangements of devices hereinafter specified and claimed, and illustrated in the accompanying drawings, in which—

Figure 1 is a view in perspective embodying my invention, a portion of the case being removed to disclose the interior mechanism. Fig. 2 is a vertical cross-section on the line 2 2, Fig. 4. Fig. 3 is a partial plan view of portions of the registering-wheels and certain related parts. Fig. 4 is a rear elevation with a portion of the case removed to show features of the interior mechanism, and Fig. 5 is a detail view showing one of the tablet-levers in connection with an adjacent registering-wheel.

My invention relates to that class of cash registers and indicators wherein the amount of a given purchase may be indicated by displaying a tablet denoting the amount of the purchase, the tablet being displayed by the actuation of a corresponding key, while at the same time the device registers the amount of the purchase, the tablet being removed from its displayed position when the money-drawer is subsequently opened by a successive operation of the device, the tablet remaining displayed while the money-drawer is closed.

One of the main objects of my present invention is to display also a detective device or card whenever the drawer is opened or whenever the drawer is closed and an indicator-tablet is not displayed, the detective device being removed from its displayed position whenever both the drawer is closed and at the same time a tablet is displayed to indicate a given purchase.

Other features of this invention relate to the means of setting the registering-wheels in primary position, to the means for throwing the drawer open when released, to the engagement of the depending register-actuating arm of the tablet-lever with the corresponding register-wheel, to the arrangement and functions of the cross-bars to hold the registering-wheels from moving inadvertently, and to the general construction, combination, and arrangement of parts.

I carry out my invention as follows:

A represents any suitable case; A', the drawer.

B denotes a series of registering-wheels provided with a suitable number of teeth $b$ at the periphery thereof. At the periphery of said wheels they are also provided with numbers to indicate desired amounts of money registered thereby. These wheels B are rotatable upon a shaft B' common thereto.

C denotes an additional series of registering-wheels, similar in construction to the wheels B and rotatable upon a shaft C'. At each revolution of the wheels B their several registered amounts are registered upon the corresponding wheel C in a well-known manner.

Beneath the series of wheels C is located a bar D, provided with a series of spurs $d$ to limit the revolution of the wheels C to a single revolution, the wheels C being provided with pins or studs $c$, arranged to strike against the corresponding spurs $d$.

E denotes a series of tablet-carrying levers, each provided with an operating arm or key E', projecting through the case, which is properly slotted, as indicated at $a$, for the purpose of permitting the proper operation of the keys. These levers are also provided with suitable tablets $E^2$ and with depending register-actuating arms $E^3$. While I do not limit myself to any specific construction of said levers, it will be convenient to rivet the keys E' to the arms $E^3$, as indicated, the whole forming a bell-crank lever fulcrumed, as at $e$, upon a rod $E^4$, extending across the machine.

The tablets $E^2$ are numbered in a manner to correspond with the adjacent registering-wheels B. At each operation of the keys the corresponding arm E³ engages a tooth of the adjacent wheel B and rotates said wheel one step.

Each of the arms E³, it will be observed, extends radially from the shaft or rod E¹ and of course travels in the arc of a circle. At its lower end each of the arms E³ is preferably bent to form a flange or engaging edge $e'$ to engage the adjacent tooth of the corresponding wheel B. It is obvious by reference to Fig. 5 especially that when the arm E³ has engaged the corresponding tooth of the registering-wheel and forced the wheel over one step the following tooth of said wheel is moved into a position therebefore such as to prevent the accidental disengagement of the arm E³ from the wheel, said following tooth being moved directly into the line of travel which the said arm must take to be inadvertently disengaged from the wheel. By this means the tablets will be held up in displayed position when the corresponding key is actuated until the key is released from the corresponding registering-wheel. The shafts B' and C', as well as the bar D, are supported at their extremities upon end plates F, fulcrumed upon end brackets G, fastened to the case A, the fulcrum-pin being shown at $g$.

H is a lever to lock and release the drawer A', said lever being fulcrumed intermediate its ends on a pin $g'$ and located between one of the plates F and the adjacent bracket G. The corresponding plate F is provided with a spur $f$, projecting under the lever H, whereby when said lever is depressed the plates F will be rocked or tilted forward, together with the devices connected therewith. It will be observed from this construction and arrangement that two end plates F F, with the connecting-shafts B' C' and bar D, form a tilting or oscillating carriage, whereby the wheels B may be rocked forward to permit the disengagement of the arms E³ therefrom to retract the tablets.

J denotes a bail fulcrumed at its extremities in any suitable manner, as upon the rod E⁴, and extending across the machine underneath the depending register-actuating arms E³. An arm H' of the lever H, which projects upward at the rear of the fulcrum, engages said bail, as by a spur $j$, extending over the rear end of said lever to tilt the bail upward when the lever H is depressed, the bail when so operated striking against any tablet-levers that may be in engagement with the registering-wheels and releasing them from the wheels, thereby to move the tablet out of displayed position. It will be seen that this movement of said bail takes place simultaneously with the tilting of said carriage forward, thereby carrying the registering-wheels B into position where the movement of the bail may readily effect the disengagement of the arms E³ therefrom.

H² is an arm of the lever H which projects downward and engages the drawer A' when in closed position to hold it in locked position. The depression of the lever H lifts the arm H² out of engagement with the drawer, permitting it to be opened.

I and I' denote two bars extending across the machine, the one in normal contact with the series of wheels B and the other in normal contact with the wheels C and serving as pawls to hold the wheels from any inadvertent backward movement.

The bar I rests at its extremities upon the plates F and may be lifted out, being held normally in place by springs I². Said plates are provided with levers F², fulcrumed thereupon, whereby said bar I may be lifted out of its normal position to release it from the wheels B and permit their retraction. The bar I' rests normally at its extremities also in recesses $f'$, as shown in Fig. 2, of said plates, being held in normal position by springs I³, permitting its disengagement from the wheels C and their retraction.

Q denotes a detection device or card supported upon a vertical shaft Q', cranked at its lower end, as shown at $q$. This shaft projects downward within the case, as shown.

When the money-drawer is closed and a tablet is displayed indicating a given purchase, this detective device or card is moved out of displayed position or into the position indicated in Figs. 1 and 2, the displayed position being indicated in Fig. 4. This detective device might bear any suitable inscription, such, for example, as that shown in Fig. 2. This detective device, as already noted, is to be displayed whenever the drawer is open or a tablet is not displayed and is to be moved out of displayed position only when both the drawer is closed and a tablet is displayed. To effect this result, K denotes a bail extending across the machine to the rear of the tablets E² and adjacent to the tablets, said bail being bent toward the ends to form upright arms K' K², fulcrumed to the case, as indicated at $k$, the extremities of said arms projecting downward and bearing against the drawer A' when in closed position, springs K³ exerting their tension to force the lower ends of the arms K' K² against the drawer and to force the drawer open when the arm H² is released therefrom.

L denotes another bail extending across the rear of the machine adjacent to the crank $q$ of the shaft Q', said bail being provided with upright arms L' L², which may be fulcrumed at $k$ also. It will be evident that when the bail L is tilted forward it will strike against the crank $q$ and give a partial rotation to the shaft Q' sufficient to remove the device Q from displayed position. The crank is connected to the bail L by a link $l$, whereby when the bail is moved back into normal position the crank will be pulled around to turn the device Q into displayed position.

Engaged with one of the arms of the bail K is a bracket $k'$, to the outer end of which one end of a spring $K^4$ is engaged, the opposite end of the spring being engaged with the adjacent arm of the bail L.

M is an oscillatory bar extending transversely at one end of the machine, and normally lying in the path of the forward movement of the bail L to prevent the forward movement of said bail until said bar is moved out of the way. At its forward end the bar is fulcrumed to the case, as indicated at $m$. The rear end of said bar is bent longitudinally of the machine, so as to normally extend across the forward path of the adjacent arm of the bail L.

M' is a stop to limit the downward movement of the bar M.

The bail L is provided with a finger $l$ to project under the rear end of the bar M when lifted out of normal position.

To lift the bar M out of the way of the bail L, I provide a swinging cross-bar N, extending across the machine over the levers E, so as to be lifted when any given tablet is lifted into displayed position. With the bar N is engaged an upright bar N', projecting upward beneath the bar M, so that when the cross-bar N is lifted by any given lever E the bar M will also be lifted out of the way of the bail L. It will now be perceived that when the drawer is closed it will strike the lower ends of the upright arms of the bail K and tilt the upper portion of said bail forward, distending the spring $K^4$ thereby, the bail L remaining, however, in normal position, if a tablet $E^2$ be not displayed, by reason of the bar M not being removed. When a tablet-lever is actuated, however, the upright arm N' lifts the bar M and allows the spring $K^4$ to move the bail L forward to turn the crank $q$ and turn the device Q into undisplayed position. If, on the other hand, a tablet-key were actuated to display a tablet while the drawer was open, the bar M would be moved out of position, but the bail L would not be operated, and hence the device Q would remain displayed. This device therefore effectually prevents tampering with the machine. The advantages of this feature of my invention are evident, as without it an operator might leave the drawer open, and if a subsequent purchase was the same in amount as the preceding the operator might seem to display a tablet without doing so and consequently make no record of the purchase whatever.

Since the depression of the lever H to open the drawer disengages every tablet-lever with the registering-wheels, it is evident that, as he must register a given purchase and close the drawer to remove the device Q from displayed position, he is compelled to register each purchase and close the drawer each time a purchase is made, else the detection device Q tells the story of his failure. The usual gong-signal may be provided to be sounded when the drawer is opened.

To set the registering-wheels at zero, I have arranged to attach a crank P to the shaft B'. Inasmuch as the wheels B are each provided with a stud $b'$ to actuate the corresponding wheels C it will be apparent that rotating the wheels B in the direction opposite the normal movement by the crank P will not only restore the wheels B to primary position, but the wheels C also, all by one key. The bar K is arranged, as shown, at the rear of the tablets E and extending just over the upper ends of the levers E when in normal position, i. e., when the drawer is closed, thereby locking all the register-actuating levers that may be in normal position and preventing their operation until the drawer is opened.

The wheels B, it will be seen, are released from the levers E when tilted forward by depression of the lever H, leaving the arms $E^3$ free to move into normal position, the operation of the bail J insuring their return to normal position.

While I have described a specific construction, combination, and arrangement of devices for removing an obstruction, so that the detective device Q may go out of view when the drawer is closed and any of a series of register-actuating keys is operated, yet I would have it definitely understood that I do not limit myself thereto, as my invention broadly contemplates such actuation of a detective device as coming within its scope, my invention contemplating any suitable mechanism for removing a detective device by the joint actuation of any of a series of registering-keys and the closing of the drawer, whichever may first take place, either the closing of the drawer or the operation of a register-actuating key, the order in which these two operations take place being immaterial.

The detective device may be of any desired construction to call attention to the failure of the operator to register the amount of a given purchase and to close the money-drawer, while the detective device shown is in the nature of a card to be displayed and to be moved out of displayed position.

Any other device of an analogous nature and adapted for the same purpose may be employed instead.

Instead of a detective device to be displayed to the eye a device that would sound a detective signal might be employed.

What I claim as my invention is—

1. In a cash register and indicator, the combination of a detective device, a series of register-actuating keys, a drawer, and means actuated by the drawer and by the register-actuating keys to throw the detective device into and out of action, so combined and actuated that either a given register-actuating key may be manipulated or the drawer may be closed, the one independently of the other without throwing the detective device out of action, so that the combined operation of a registering actuating-key and the closing of the drawer is required to throw the detective device out of action, substantially as set forth.

2. In a cash register and indicator, the combination of a detective device, a series of register-actuating keys provided with tablets to be displayed when the corresponding key is actuated and to be thrown out of displayed position when the key is unactuated, a drawer, and means to throw the detective device into action when the drawer is open or a tablet is not displayed, and to throw said detective device out of action when both the drawer is closed and a tablet is displayed, and so combined and actuated that either a given register-actuating key may be manipulated or the drawer may be closed, the one independently of the other and still leave the detective device in action, substantially as set forth.

3. In a cash register and indicator, the combination of a detective device, a series of register-actuating keys, a drawer, a device to control the opening of the drawer, and means to throw said detective device into displayed position when either the drawer is open or all said keys are in normal position, and to remove the detective device from displayed position when both the drawer is closed and any one of said series of register-actuating keys is manipulated, so combined and actuated that either a given register-actuating key may be manipulated or the drawer may be closed, the one independently of the other and still leave the detective device in action, substantially as set forth.

4. In a cash register and indicator, the combination of a detective device, a series of register-actuating keys, a drawer, means to actuate the detective device, an obstacle to prevent the actuation of said detective device, and means to remove said obstacle when both the drawer is closed and any one of said keys is in operated position, and so combined and actuated that either a given register-actuating key may be manipulated or the drawer may be closed, the one independently of the other and still leave the detective device in action, so that the combined operation of a register-actuating key and the closing of the drawer is required to throw the detective device out of action, substantially as described.

5. In a cash register and indicator the combination of a detective device, a series of register-actuating keys, a drawer, a spring-actuated bail K contacting with the drawer when in closed position, a spring-actuated bail L to operate the detective device, an obstruction in the path of the bail L, and a bail J actuated by any one of said keys to remove said obstruction, substantially as set forth.

6. In a cash-register the combination of a drawer, a series of register-actuating keys, a spring-actuated bail K to lock all the unoperated register-actuating keys when the drawer is closed, means to lock and to release the drawer, said drawer forced open by said bail when free to move, substantially as set forth.

7. In a cash register and indicator the combination of a detective device, a series of register-actuating keys, a drawer, a swinging bail K, a swinging bail L to actuate the detective device, a bar M in the path of the bail L, a swinging bail J to remove the bar M from the path of the bail L, and a spring connecting the bails K and L, all arranged substantially as and for the purpose described.

8. In a cash register and indicator, the combination of a series of rotatable registering-wheels B, a series of registering-wheels C, and transverse bars I and I' in normal contact with all the said series of wheels respectively, and simultaneously disengageable therefrom, substantially as and for the purposes described.

9. In a cash register and indicator the combination of a series of toothed registering-wheels arranged to have an oscillatory movement, a series of register-actuating keys provided with arms engageable with a given tooth of a corresponding registering-wheel to move said wheel one step upon the depression of the key and a swinging bail J beneath said arms, the tooth of the wheel following said arm preventing the inadvertent release of the arm from the registering-wheel, said wheel releasable from said arm upon the oscillation thereof, the movement of said bail insuring the return of said keys to normal position when released from the wheel, substantially as set forth.

10. In a cash register and indicator the combination of a series of toothed registering-wheels arranged to have an oscillatory movement, a series of register-actuating keys provided with arms to engage the teeth of the corresponding registering-wheels, a swinging bail underneath said arms, a drawer, and a lever to lock and to release said drawer, said lever also arranged to oscillate said wheels, and to actuate said bail, substantially as set forth.

11. In a cash register and indicator, the combination of the shafts B' and C', a series of toothed registering-wheels loosely mounted thereupon, a series of register-actuating keys provided with radial projecting arms engageable with a given tooth of the corresponding registering-wheel upon the operation of the key to turn said registering-key one step, rocking supports for said shafts, locking-bars I and I' carried by said supports and arranged to simultaneously lock all the said registering-keys from a backward movement, and means to release said locking-bars from said registering-wheels, substantially as set forth.

12. In a cash register and indicator, the combination of a drawer, means to lock and release the drawer, a series of register-actuating keys, a detective device, a spring-actuated bail K to actuate said detective device and bearing against the drawer when in closed position, said drawer forced open by said spring-actuated bail when the drawer is unlocked, the combined action of a register-actuating key and the closing of the drawer being required to throw the detective device out of action, substantially as set forth.

13. In a cash register and indicator, the combination of a drawer, means to lock and to release the drawer, a detective device, spring-actuated bails K' and L' to actuate the detective device, one of said bails provided with an arm bearing against the drawer when in a closed position, said drawer forced open by said arm when unlocked, substantially as set forth.

14. In a cash register and indicator, the combination of a shaft B', rotatable registering-wheels B mounted upon said shaft, keys to actuate said wheels, rotatable registering-wheels C actuated by the corresponding wheels B, locking devices to lock said registering-wheels, and means to rotate the shaft B' when the locking devices are released and thereby set all of said registering-wheels in primary position, substantially as set forth.

15. In a cash register and indicator, the combination of a series of rotatable registering-wheels B, a series of registering-wheels C, end plates F and transverse bars I I' in normal contact with all of the said series of wheels respectively, and normally carried by said end plates, and means to release said bars from said wheels, substantially as set forth.

16. In a cash register and indicator the combination of a series of register-actuating keys, a drawer, and a detective device actuated by the combined operation of the drawer and one of said keys, to throw the detective device out of action, the drawer being arranged to close independent of the actuation of one of said keys without actuating the detective device, for the purpose set forth.

In testimony whereof I sign this specification in the presence of two witnesses.

WILLIAM T. McGRAW.

Witnesses:
 N. S. WRIGHT,
 M. A. MARTIN.